(12) United States Patent
Watanabe et al.

(10) Patent No.: US 12,443,253 B2
(45) Date of Patent: Oct. 14, 2025

(54) ELECTRONIC APPARATUS

(71) Applicant: LENOVO (SINGAPORE) PTE. LTD., Singapore (SG)

(72) Inventors: Ryota Watanabe, Yokohama (JP); Qianyi Lu, Yokohama (JP); Jun Iwasaki, Yokohama (JP); Masaaki Bandoh, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 288 days.

(21) Appl. No.: 18/457,514

(22) Filed: Aug. 29, 2023

(65) Prior Publication Data

US 2024/0160258 A1 May 16, 2024

(30) Foreign Application Priority Data

Nov. 16, 2022 (JP) ................. 2022-183510

(51) Int. Cl.
*G06F 1/20* (2006.01)
*G06F 1/16* (2006.01)
*H05K 7/20* (2006.01)
*H05K 9/00* (2006.01)

(52) U.S. Cl.
CPC ............ *G06F 1/203* (2013.01); *G06F 1/1656* (2013.01); *G06F 1/1698* (2013.01); *H05K 7/20154* (2013.01); *H05K 7/20336* (2013.01); *H05K 7/2049* (2013.01); *H05K 9/0022* (2013.01)

(58) Field of Classification Search
CPC ...... G06F 1/203; G06F 1/1656; G06F 1/1698; H05K 7/20154; H05K 7/20336; H05K 7/2049; H05K 9/0022
See application file for complete search history.

(56) References Cited

U.S. PATENT DOCUMENTS

| | | | |
|---|---|---|---|
| 9,131,037 B2 * | 9/2015 | Corbin | H05K 9/006 |
| 10,667,442 B2 * | 5/2020 | Nakata | G06F 1/20 |
| 2021/0243925 A1 * | 8/2021 | Ramasamy | H05K 9/0015 |

FOREIGN PATENT DOCUMENTS

| | | |
|---|---|---|
| JP | 2011205043 A | 10/2011 |
| JP | 2019212832 A | 12/2019 |

* cited by examiner

*Primary Examiner* — Mukundbhai G Patel
(74) *Attorney, Agent, or Firm* — SHIMOKAJI IP (57) ABSTRACT

An electronic apparatus includes a chassis, a heat generating body provided in the chassis, an antenna configured to be provided in the chassis and be capable of receiving radio waves, an electronic part arranged to be aligned with the antenna within the chassis, and a cooling module configured to have a plate-shaped metal part and cool the heat generating body within the chassis. The metal part includes a shield wall interposed between the antenna and the electronic part.

6 Claims, 7 Drawing Sheets

ELECTRONIC APPARATUS

BACKGROUND OF THE INVENTION

Field of the Invention

The present invention relates to an electronic apparatus having an antenna.

Description of the Related Art

An electronic apparatus like a laptop PC, a tablet PC or the like has been loaded with an antenna for wireless communication, etc. in addition to a board on which a CPU (Central Processing Unit) and a memory (RAM: Random Access Memory), etc. are mounted. In this type of electronic apparatus, an electronic part (for example, a memory) is required to be shielded in order to prevent electromagnetic wave noise from the electronic part from affecting the reception sensitivity of the antenna. Conventionally, as such a shield, there has been known a configuration in which an electronic part is surrounded by a metal-made shield box (refer to, for example, Japanese Unexamined Patent Application Publication No. 2011-205043).

SUMMARY OF THE INVENTION

In the above-mentioned electronic apparatus, the antenna and the memory may have to be arranged close to each other due to the layout of each part in a chassis. In this type of electronic apparatus, however, there is a great demand for miniaturization of the chassis. For this reason, it may not be possible to secure installation space for, for example, a shield box surrounding the memory, and installation space for a clip to fix it to the board, and the like.

The present invention has been made in view of the problems of the above related art. An object of the present invention is to provide an electronic apparatus capable of shielding between an antenna and an electronic part.

An electronic apparatus according to a first aspect of the present invention includes a chassis, a heat generating body provided in the chassis, an antenna configured to be provided in the chassis and be capable of receiving radio waves, an electronic part arranged to be aligned with the antenna within the chassis, and a cooling module configured to have a plate-shaped metal part and cool the heat generating body within the chassis. The metal part includes a shield wall interposed between the antenna and the electronic part.

According to the above aspect of the present invention, it is possible to shield between an antenna and an electronic part.

DETAILED DESCRIPTION OF THE INVENTION

An electronic apparatus according to the present invention will hereinafter be described in detail by a preferred embodiment with reference to the accompanying drawings.

Figure 1:
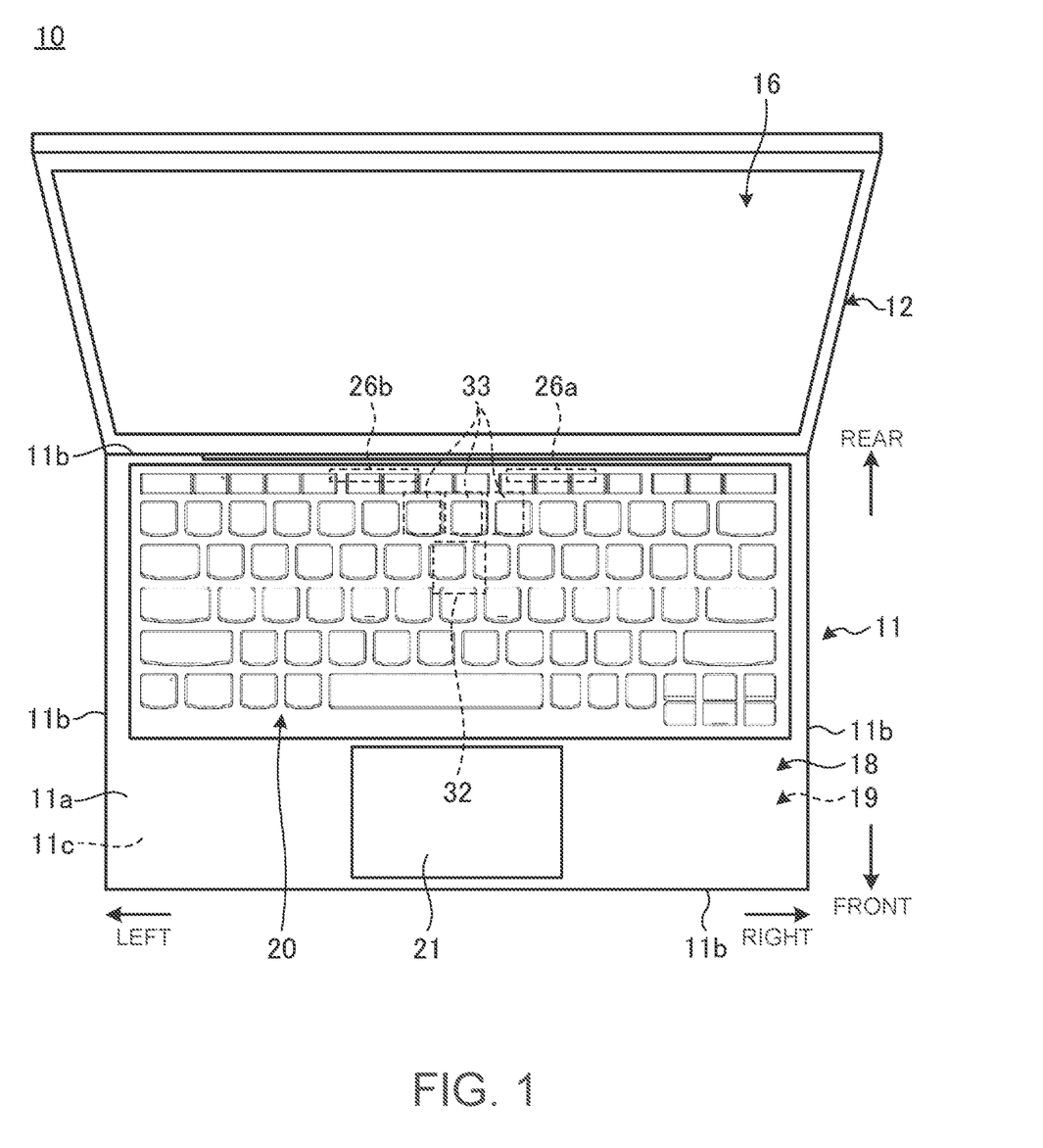
FIG. 1 is a schematic plan view of an electronic apparatus according to an embodiment as viewed from above.

FIG. 1 is a schematic plan view of an electronic apparatus 10 according to an embodiment as viewed from above. As illustrated in FIG. 1, the electronic apparatus 10 is a laptop PC having a chassis 11 and a display chassis 12 relatively rotatably connected by a hinge. The electronic apparatus 10 according to the present embodiment is configured to be rotatable by the hinge in an angular range of 360° between the chassis 11 and 12. The electronic apparatus 10 assumes a housed form in which the chassis 11 and 12 are closed when the angle between the chassis 11 and 12 is set to 0°, a form of a laptop PC when it is set around 120°, and a form of a tablet PC when it is set to 360°. The electronic apparatus according to the present invention may be a clamshell type laptop PC which can be rotated from 0° to 180° or so between the chassis 11 and 12, or may be a desktop PC, a tablet PC, a smartphone, or a game machine, or the like.

The display chassis 12 is a flat box body thinner than the chassis 11. A display 16 is mounted on the display chassis 12. The display 16 is constituted of, for example, an organic EL or a liquid crystal.

As illustrated in FIG. 1, the chassis 11 and each constituent element mounted thereon will hereinafter be described with the front side as front, the back side as rear, the width direction as left and right, and the thickness direction as up and down, based on the posture of viewing the display 16 with the chassis 11 and 12 opened at a predetermined angle.

The chassis 11 is a flat box body. The chassis 11 is constituted into a box-like shape by a first cover member 18 forming an upper surface 11a and four peripheral side surfaces 11b and a second cover member 19 forming a bottom surface 11c. The upper first cover member 18 has a substantially bathtub shape with an opened lower surface. The lower second cover member 19 has a substantially flat plate shape and serves as a lid body which closes a lower surface opening of the first cover member 18 (refer to FIG. 4). The chassis 11 may be configured such that the second cover member 19 is formed into a substantially bathtub shape and the first cover member 18 serves as a lid body which closes an upper surface opening of the second cover member 19.

A keyboard 20 and a touchpad 21 are provided on the upper surface 11a of the chassis 11. The hinge relatively rotatably connects between a rear edge of the chassis 11 and one edge of the display chassis 12, which is adjacent thereto.

Figure 2:
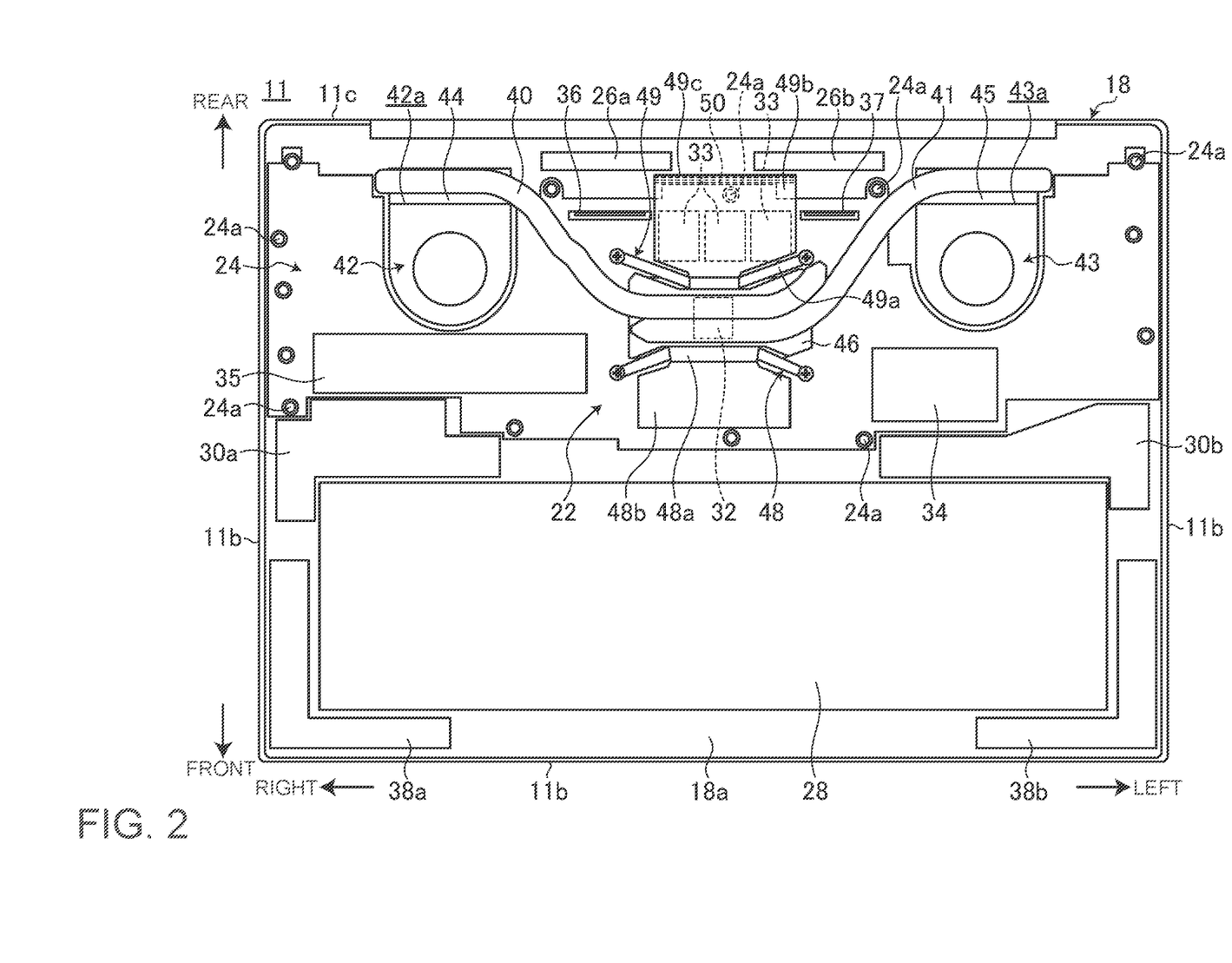
FIG. 2 is a bottom view schematically illustrating an internal structure of a chassis.

FIG. 2 is a bottom view schematically illustrating an internal structure of the chassis 11 and is a view of the inside of the chassis 11 as viewed from below with the second cover member 19 removed.

As illustrated in FIG. 2, the chassis 11 is provided therein with a cooling module 22, a motherboard 24, antennas 26a and 26b, a battery device 28, and speaker devices 30a and 30b. The chassis 11 is further provided therein with various electronic parts, mechanical parts, and the like.

The motherboard 24 is a printed board which serves as a main board of the electronic apparatus 10, and extends left and right behind the chassis 11. The motherboard 24 has a CPU 32 mounted approximately in the center thereof. The motherboard 24 may further be mounted with a GPU (Graphics Processing Unit). The motherboard 24 is further mounted with various electronic parts such as a power component in addition to memories (RAMs) 33, a communication module 34, an SSD (Solid State Drive) 35, and connectors 36 and 37. The motherboard 24 has an upper surface which serves as a mounting surface of the CPU 32 or the like, and a lower surface which serves as an attaching surface for the first cover member 18. The motherboard 24 has a plurality of boss portions provided along the outer peripheral edge thereof and screwed to an inner surface 18a of the first cover member 18 via each boss portion 24a.

Each memory 33 is a main memory (main storage device) connected to the CPU 32 and used in executing various processing by the CPU 32, and the like. The memories 33 include, for example, three semiconductor chips arranged side by side in the left and right. The communication module 34 is a module corresponding to, for example, a WWAN (Wireless WAN). Antennas 38a and 38b for WWAN are provided at the left and right front corners of the chassis 11, respectively. The SSD 35 is a storage device for storing data. A flexible board connected to the display 16 is connected to the connector 36. A flexible board connected to a touch panel mounted with the display 16 is connected to the connector 37.

The antennas 26a and 26b (hereinafter, they may be collectively referred to as the "antenna 26") are provided side by side in the left and right in the center of a rear end of the chassis 11. The antenna 26 is capable of receiving and transmitting WLAN (Wireless LAN) radio waves, for example. A communication module for WLAN may be mounted on the motherboard 24 as appropriate or may be provided integrally with the communication module 34.

The battery device 28 is a charging battery which serves as a power supply of the electronic apparatus 10. The battery device 28 is arranged in front of the cooling module 22 and the motherboard 24 and extends from side to side along a front end of the chassis 11.

Next, a configuration example of the cooling module 22 will be described.

The CPU 32 is the largest heat generating body among the electronic parts loaded in the chassis 11. The cooling module 22 absorbs and diffuses heat generated by the CPU 32 and exhausts the heat out of the chassis 11 to thereby cool the CPU 32. The cooling module 22 is laminated to cover a part of the mounting surface of the motherboard 24, for example. In the case of a configuration loaded with the GPU, the cooling module 22 may be used for cooling of the GPU.

As illustrated in FIG. 2, the cooling module 22 includes two heat pipes 40 and 41, a pair of fans 42 and 43, a pair of heat sinks 44 and 45, a heat receiving member 46, and elastic members 48 and 49.

The heat pipes 40 and 41 are pipe type heat transport devices. The heat pipes 40 and 41 are arranged side by side in a state of partly abutting or close to each other side by side in the front and rear. The one heat pipe 40 has a first end connected to the CPU 32 via the heat receiving member 46, and a second end connected to the one heat sink 44. The other heat pipe 41 has a first end connected to the CPU 32 via the heat receiving member 46, and a second end connected to the other heat sink 45. Each of the heat pipes 40 and 41 has a configuration in which a metal pipe is crushed thinly and flatly and formed into an elliptical cross-sectional shape, and working fluid is enclosed in a closed space formed in the metal pipe. The working fluid circulates while causing a phase change within the closed space, and transports heat highly efficiently.

The right and left fans 42 and 43 are slightly different in size, air volume or the like, but substantially have a right/left symmetrical structure. Likewise, the right and left heat sinks 44 and 45 also substantially have a right/left symmetrical structure. The fans 42 and 43 and the heat sinks 44 and 45 may be configured by only one of them instead of a pair of left and right.

The fan 42 (43) is arranged so that a rearwardly-opened exhaust port 42a (43a) faces the heat sink 44 (45). Each of the fans 42 and 43 is a centrifugal fan that rotates an impeller housed inside a fan chassis by a motor. Each of the fans 42 and 43 has air intake ports which are opened on both upper and lower surfaces of the fan chassis, or has an air intake port which is opened on one surface thereof. Each of the heat sinks 44 and 45 has a structure in which a plurality of fins extending along the front-rear direction and erected in the vertical direction are arranged horizontally at equal intervals. A gap through which air sent from the fans 42 and 43 passes is formed between the adjacent fins.

Figure 3A:
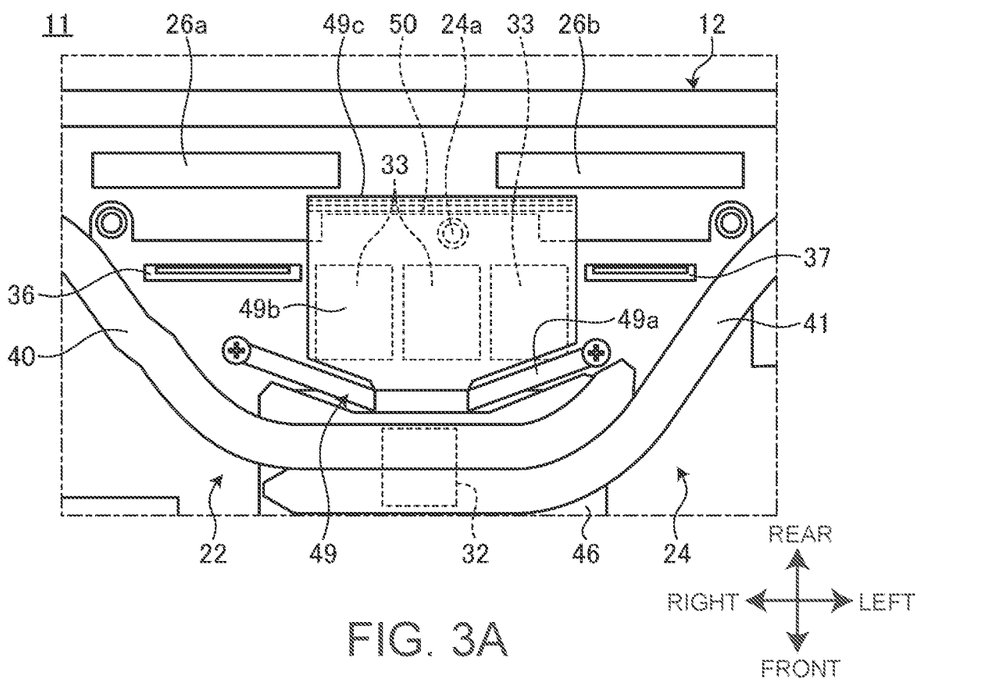
FIG. 3A is an enlarged view of memories and peripheral portions thereof illustrated in FIG. 2.
Figure 3B:
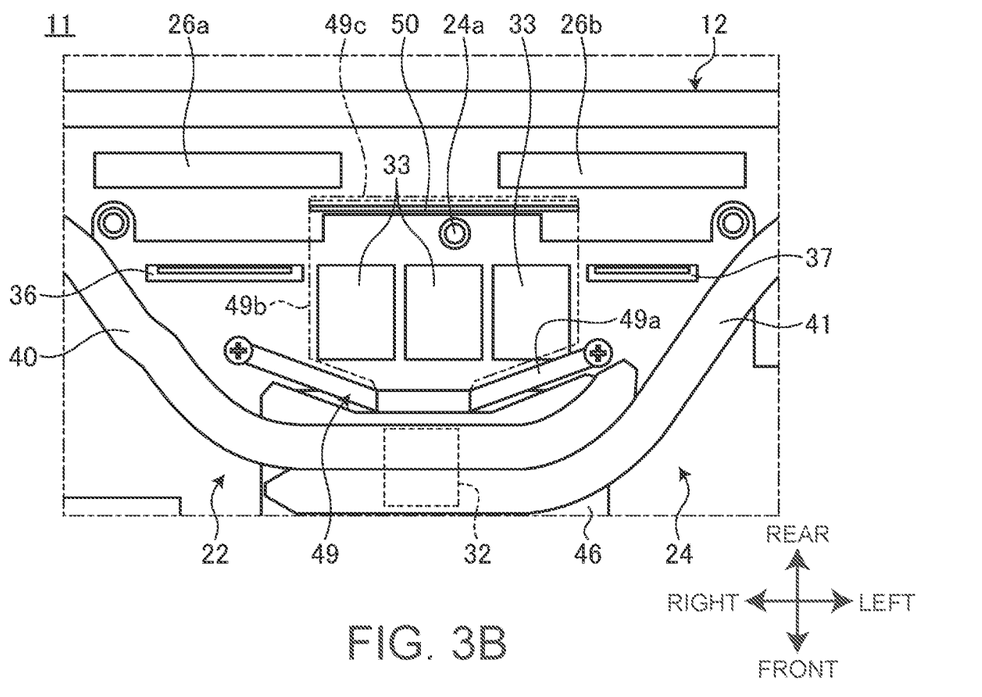
FIG. 3B is a view in which a protruding plate portion illustrated in FIG. 3A is omitted.
Figure 4:
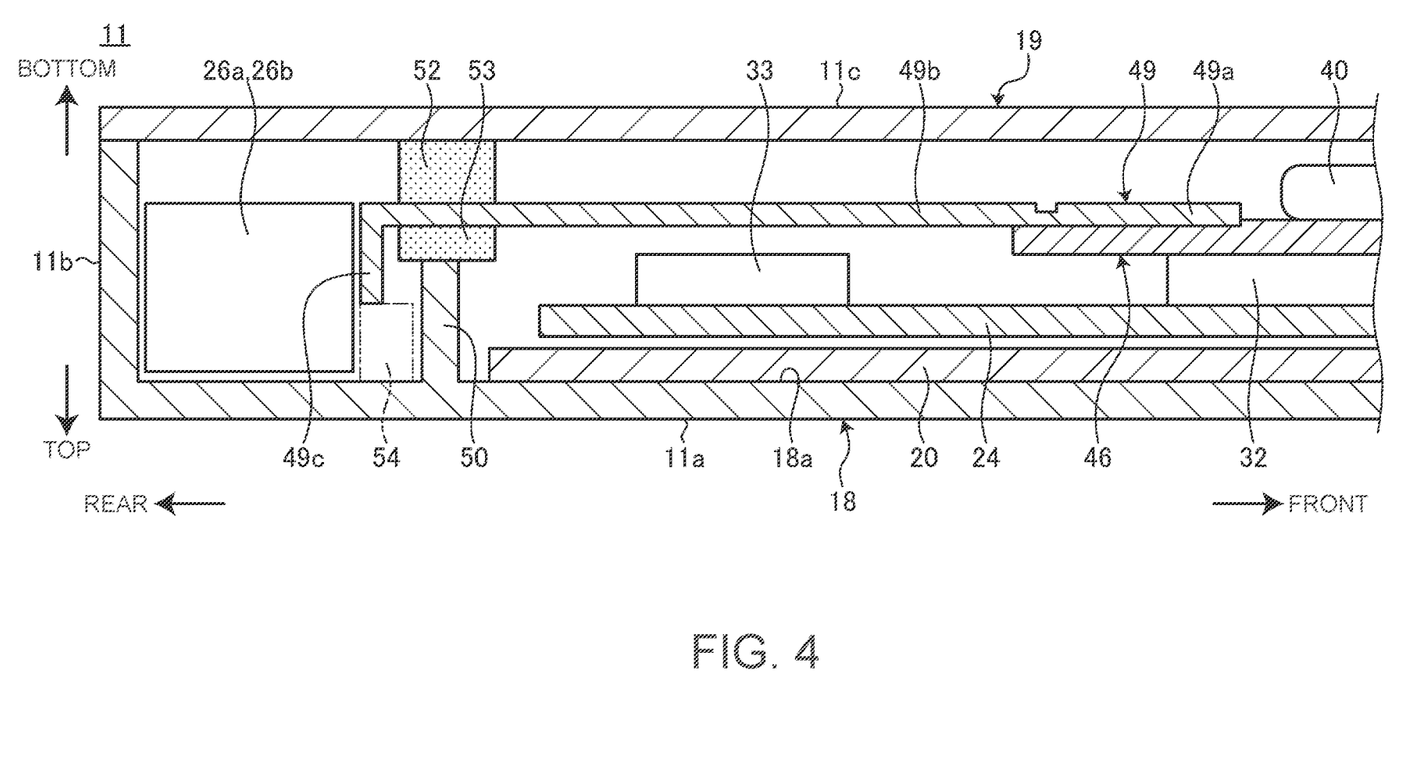
FIG. 4 is a schematic side sectional view of the chassis, which illustrates a sectional structure at the memory and the peripheral portions thereof.

FIG. 3A is a view illustrating in an enlarged form, the memories 33 illustrated in FIG. 2 and their peripheral portions. FIG. 3B is a view illustrating a protruding plate portion 49b illustrated in FIG. 3A with a two dots chain line. FIG. 4 is a schematic side sectional view of the chassis 11, which illustrates a sectional structure at the memories 33 and the peripheral portions thereof.

As illustrated in FIGS. 2 to 4, the heat receiving member 46 is a metal part which adheres to the CPU 32 and receives heat generated by the CPU 32. The heat receiving member 46 is a metal plate-shaped member having high thermal conductivity like copper or aluminum. The heat receiving member 46 in the present embodiment is a rectangular copper plate. The heat receiving member 46 is arranged so as to be laminated on the mounting surface of the motherboard 24 at the position where it covers the CPU 32, and abuts on the top surface of the CPU 32. The heat pipes 40 and 41 are connected to the lower surface of the heat receiving member 46 at portions thereof juxtaposed to each other in front and rear.

The elastic members 48 and 49 are metal parts for pressing the heat receiving member 46 against the CPU 32 and improving their mutual adhesion. Each of the elastic members 48 and 49 is a plate-shaped spring member (leaf spring) formed of, for example, a metal such as SUS.

The one elastic member 48 presses one long side of the horizontally long heat receiving member 46. As illustrated in FIG. 2, the elastic member 48 has a pressing portion 48a and a thermal conduction plate portion 48b. The pressing portion 48a is a plate bent into a bow. The pressing portion 48a urges the heat receiving member 46 against the CPU 32 by screwing both ends thereof to the mounting surface of the motherboard 24. The thermal conduction plate portion 48b is a plate which protrudes forward from one side of the pressing portion 48a. The thermal conduction plate portion 48b covers a heat generating body such as a power component mounted onto the motherboard 24, for example, and absorbs and diffuses heat thereof. The thermal conduction plate portion 48b may be omitted.

The other elastic member 49 presses the other long side (rear edge) of the heat receiving member 46. As illustrated in FIGS. 2 to 4, the elastic member 49 has a pressing portion 49a, a protruding plate portion 49b, and a shield wall 49c. The pressing portion 49a is a plate bent into a bow and urges the heat receiving member 46 against the CPU 32 by screwing both ends thereof to the mounting surface of the motherboard 24. The protruding plate portion 49b is a plate which protrudes rearward from one side of the pressing portion 49a. The protruding plate portion 49b passes over the top surfaces (lower surfaces) of the three memories 33 juxtaposed left and right on the rear side of the CPU 32 and protrudes rearward. The shield wall 49c is formed by bending the end (rear end) of the protruding plate portion 49b upward at a substantially right angle and is installed in a vertically standing posture (refer to FIG. 4).

Incidentally, in the electronic apparatus 10 of the present embodiment, as illustrated in FIGS. 2 to 4, the CPU 32, the memories 33, and the antenna 26 are arranged in front and rear at the rear portion near the center of the left and right inside the chassis 11. That is, in the electronic apparatus 10, while minimizing the chassis 11 as much as possible, the memories 33 and the antenna 26 are arranged in close proximity due to the layout such as securing the capacity of the battery device 30 or the like. Therefore, there is a concern in the antenna 26 that the reception sensitivity thereof may be lowered due to the influence of electromagnetic wave noise generated by the memories 33. However, in the electronic apparatus 10, it is difficult to form a sufficient gap between the memory 33 and the antenna 26 due to a parts space in the chassis 11. It is not possible to secure a space to install the conventional shield box which covers each memory 33. Particularly in the present embodiment, since the boss portion 24a exists between each memory 33 and the antenna 26, it is becoming more difficult to secure an installation space for the shield box.

Therefore, the electronic apparatus 10 of the present embodiment enables the metal part constituting the cooling module 22 to have a shielding function and allows the construction of a shield structure in a narrow space.

First, the configuration and effects of a shield structure according to a first configuration example will be described.

As illustrated in FIGS. 3A to 4, the shield structure according to the first configuration example has a shield wall 49c. The shield wall 49c is interposed between an antenna 26 and each memory 33 and extends along the left and right. Preferably, the shield wall 49c has a horizontal length which can cover up the rear edges of at least all of the memories 33. Thus, the electronic apparatus 10 is provided with the metal-made shield wall 49c between the antenna 26 and the memories 33 and can suppress the antenna 26 from being affected by electromagnetic wave noise of the memories 33.

The shield structure according to the first configuration example can include a wall portion 50 which protrudes from an inner surface 18a of a first cover member 18 constituting a chassis 11. The first cover member 18 is formed of, for example, a conductive material such as a magnesium alloy, a carbon fiber-reinforced resin or the like. The wall portion 50 is a metal-made vertical wall which is formed integrally with the first cover member 18 and extends along the left and right. The wall portion 50 stands opposite a front surface of the shield wall 49c between the antenna 26 and each memory 33. That is, the wall portion 50 is arranged alternately with the shield wall 49c and aligned forward and backward with the shield wall 49c. The length of the shield portion 50 in the horizontal direction may be approximately the same as that of the shield wall 49c. Thus, in the electronic apparatus 10, the shield wall 49c and the wall portion 50 which serve as two metal plates are arranged between the antenna 26 and each memory 33, and hence shield performance of the memory 33 is further improved. Particularly, since the wall portion 50 and the shield wall 49c are alternately arranged vertically, the shield performance is further improved.

The shield structure according to the first configuration example preferably includes conductive cushion materials 52 and 53. Each of the conductive cushion materials 52 and 53 is a cushion material having conductivity such as a sponge or a gasket. The conductive cushion material 52 is sandwiched between a lower surface of a protruding plate portion 49b and an inner surface of a second cover member 19 and electrically connects the protruding plate portion 49b (shield wall 49c) and the metal-made second cover member 19. The conductive cushion material 53 is sandwiched between a tip of the wall portion 50 and an upper surface of the protruding plate portion 49b and electrically connects the first cover member 18 and the protruding plate portion 49b (shield wall 49c).

Only either one of the conductive cushion materials 52 and 53 may be installed, but both are preferably provided. Then, in the electronic apparatus 10, a high-performance shield structure in which the first cover member 18, the wall portion 50, the protruding plate portion 49b (shield wall 49c), and the second cover member 19 are electrically connected, is constructed between the antenna 26 and the memories 33. As indicated by a two-dot chain line in FIG. 4, a conductive cushion material 54 similar to the conductive cushion materials 52 and 53 may also be provided between the tip of the shield wall 49c and the inner surface 18a of the first cover member 18.

Here, in the electronic apparatus 10, when the direction (front-rear direction) along the plane direction of the chassis 11 is taken as the reference as illustrated in FIG. 2, the CPU 32, the memories 33, and the antenna 26 are arranged to be aligned in this order. Further, the protruding plate portion 49b protrudes from one side of the elastic member 49 and passes over the top surface of each memory 33. Thus, in the electronic apparatus 10, as illustrated in FIG. 4, the top surface side of the memory 33 is shielded by the protruding plate portion 49b, and the shield performance is further improved.

Figure 5:
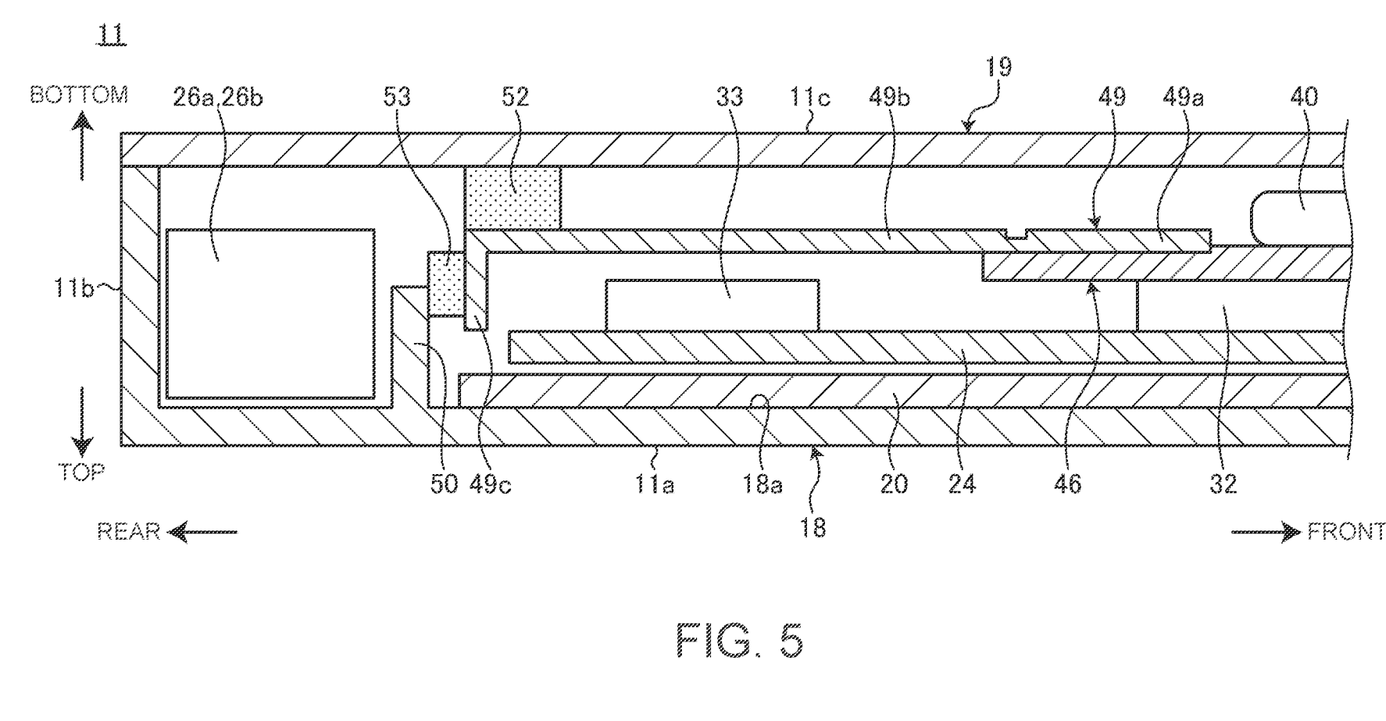
FIG. 5 is a schematic side sectional view of a chassis, illustrating a sectional structure at a memory and peripheral portions thereof in a configuration having a shield structure according to a second configuration example.

Next, the configuration and effects of a shield structure according to a second configuration example will be described. FIG. 5 is a schematic side sectional view of a chassis 11, illustrating memories 33 and their peripheral portions in the configuration having the shield structure according to the second configuration example.

The shield structure illustrated in FIG. 5 is different from the shield structure of the first configuration example illustrated in FIG. 4 in that the arrangement of a shield wall 49c and a wall portion 50 is reversed back to front. That is, in the second configuration example illustrated in FIG. 5, the wall portion 50 stands up on the rear surface side of the shield wall 49c. A conductive cushion material 53 may be installed between a rear surface of the shield wall 49c and a front surface of the wall portion 50. Thus, in such a shield structure as well, the metal-made shield wall 49c and the wall portion 50 are provided between an antenna 26 and memories 33, and the antenna 26 can be suppressed from being affected by electromagnetic wave noise of the memories 33.

Figure 6:
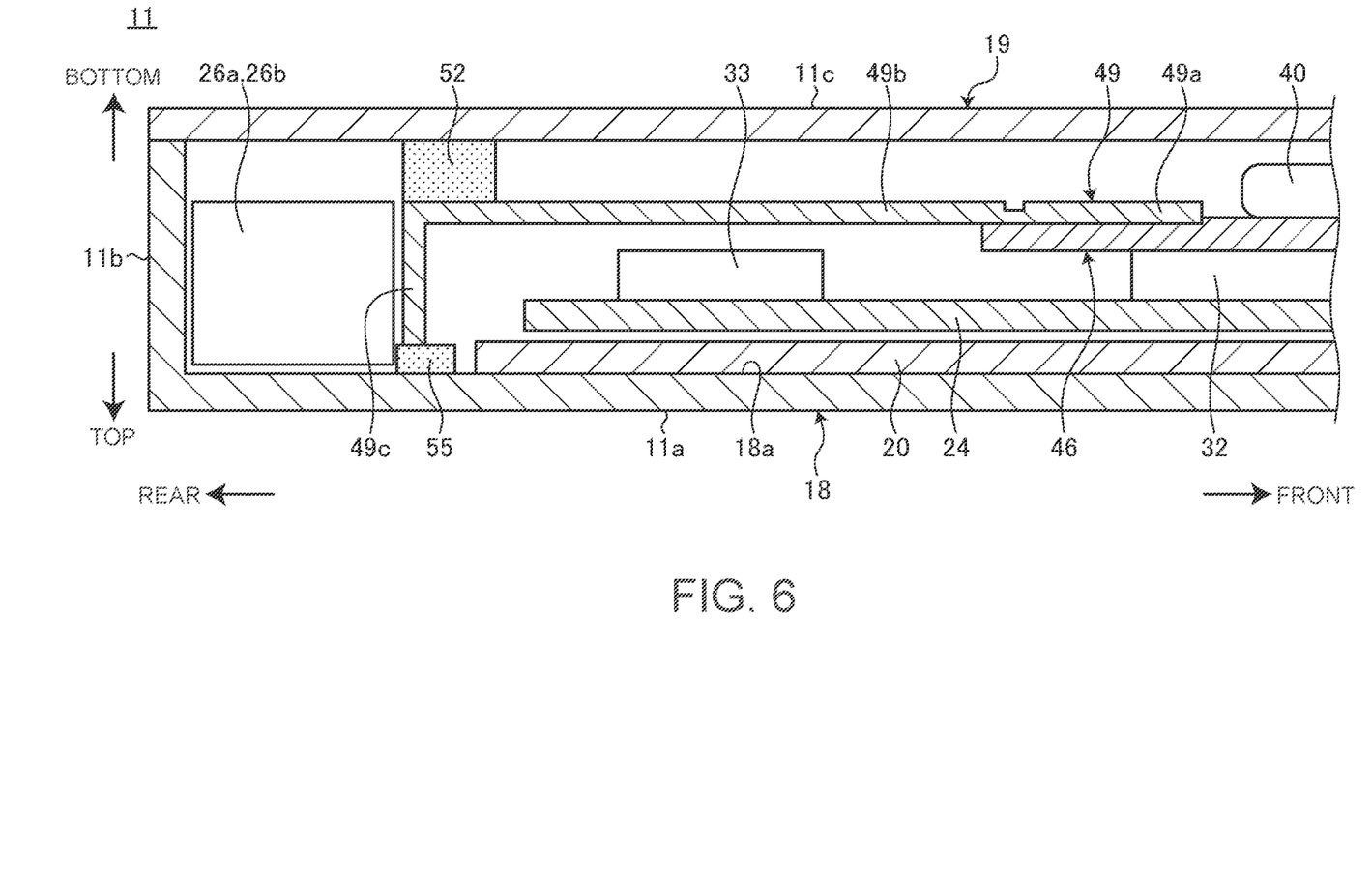
FIG. 6 is a schematic side sectional view of a chassis, illustrating a sectional structure at a memory and peripheral portions thereof in a configuration having a shield structure according to a third configuration example.

Next, the configuration and effects of a shield structure according to a third configuration example will be described. FIG. 6 is a schematic side sectional view of a chassis 11, illustrating a sectional structure at memories 33 and peripheral portions thereof in the configuration having the shield structure according to the third configuration example.

The shield structure illustrated in FIG. 6 is different from the shield structures of the first and second configuration examples illustrated in FIGS. 4 and 5 in that there is no wall portion 50. That is, the third configuration example illustrated in FIG. 6 is a configuration in which only a shield wall 49c is interposed between an antenna 26 and the memories 33. Thus, in such a shield structure as well, the metal-made shield wall 49c is provided between the antenna 26 and the memories 33, and the antenna 26 can be suppressed from being affected by electromagnetic wave noise of the memories 33. Since the shield structure is not provided with the wall portion 50, the shield structure is inferior in shield performance to the configuration examples illustrated in FIGS. 4 and 5, but the dimension in the front-rear direction can be shortened by the wall portion 50. Therefore, the shield structure can also accommodate a configuration in which the gap between the antenna 26 and each memory 33 is narrower.

As illustrated in FIG. 6, in this case, a conductive cushion material 55 is preferably sandwiched between the tip of the shield wall 49c and an inner surface 18a of a first cover member 18. The conducive cushion material 55 is a member similar to the conducive cushion materials 52 and 53 described above. Thus, in the electronic apparatus 10, a high-performance shield structure in which the first cover member 18, a protruding plate portion 49b (shield wall 49c), and a second cover member 19 are electrically connected, is constructed between the antenna 26 and the memories 33.

Figure 7:
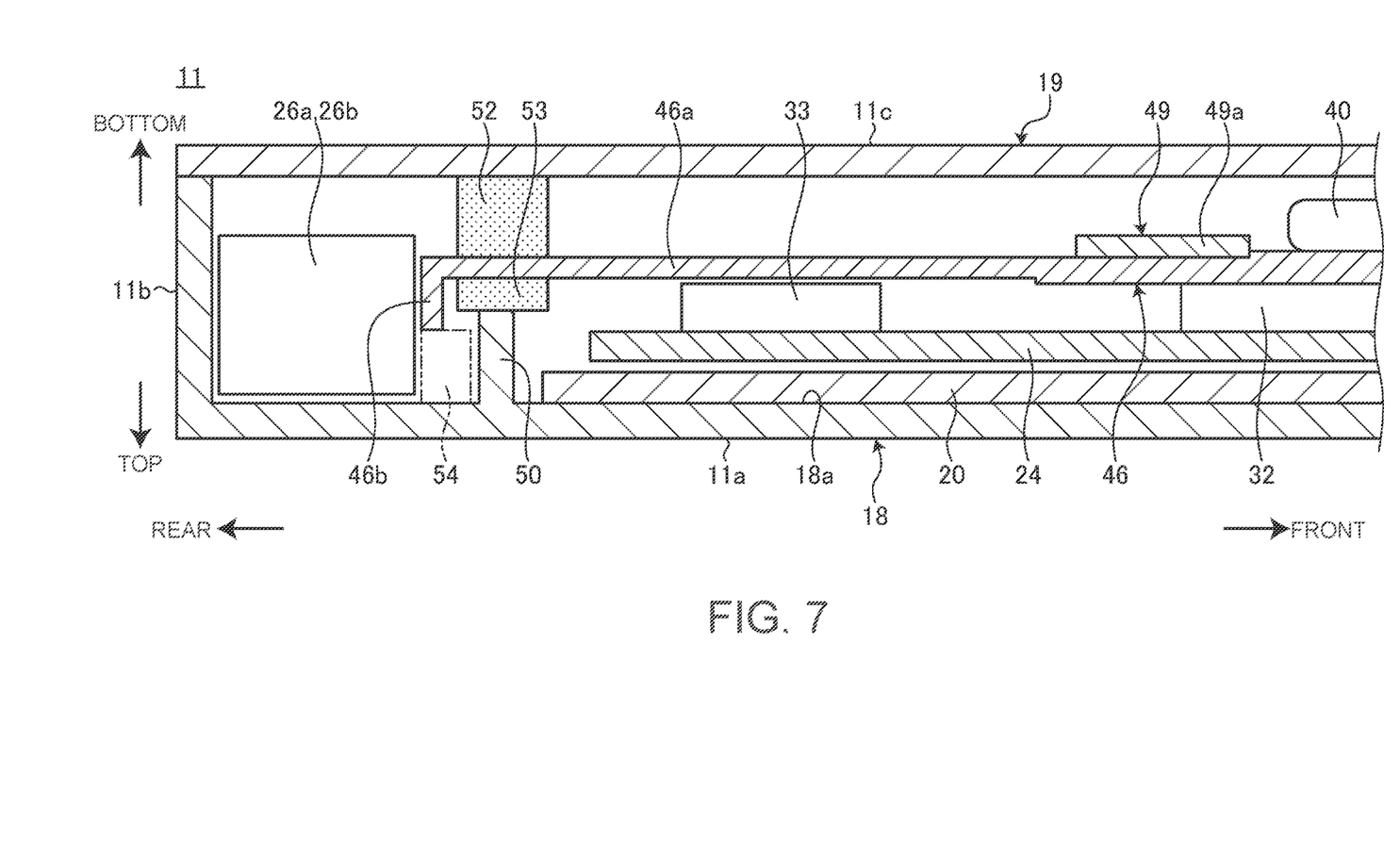
FIG. 7 is a schematic side sectional view of a chassis, illustrating a sectional structure at a memory and peripheral portions thereof in a configuration having a shield structure according to a fourth configuration example.

Next, the configuration and effects of a shield structure according to a fourth configuration example will be described. FIG. 7 is a schematic side sectional view of a chassis 11, illustrating a sectional structure at memories 33 and peripheral portions thereof in the configuration having the shield structure according to the fourth configuration example.

The shield structures according to the first, second and third configuration examples described above have provided the shield between the antenna 26 and the memories 33 by means of the protruding plate portion 49b and the shield wall 49c provided in the elastic member 49. On the contrary, the shield structure illustrated in FIG. 7 is a configuration of shielding between an antenna 26 and memories 33 by a protruding plate portion 46a and a shield wall 46b provided in a heat receiving member 46. That is, the protruding plate portion and the shield wall to shield the memories 33 may be provided in other than the elastic member 49. FIG. 7 exemplifies the configuration in which they are provided in the heat receiving member 46. Thus, in such a shield structure as well, the metal-made shield wall 46b and a wall portion 50 are provided between the antenna 26 and the memories 33. Further, since the top surfaces of the memories 33 are covered with the protruding plate portion 46a, the antenna 26 can be suppressed from being affected by electromagnetic wave noise of the memories 33. In the configuration example illustrated in FIG. 7 as well, it may be taken as a configuration in which the wall portion 50 is omitted, as in the configuration example illustrated in FIG. 6.

However, the elastic member 49 is usually formed by cutting out from a large-sized plate material as a raw material. Therefore, when the protruding plate portion and the shield wall are configured to be formed in the elastic member 49 instead of the heat receiving member 46, there is an advantage that they can be easily formed without adding a manufacturing step.

It goes without saying that the present invention is not limited to the above-described embodiments, and can be freely modified within the scope not departing from the gist of the present invention.

Although the electromagnetic wave shield structure between the antenna 26 and the memories 33 is exemplified above, the electronic part to be shielded may be other than a memory or may be a WLAN communication module or the like. Further, although there is exemplified in the above, the configuration in which the heat receiving member 46 or the elastic member 49 is used as a metal part to form the shield wall, other metal parts each constituting the cooling module 22 may be used.

The invention claimed is:

1. An electronic apparatus, comprising:
a chassis;
a heat generating body in the chassis;
an antenna in the chassis and capable of receiving radio waves;
an electronic part aligned with the antenna within the chassis; and
a cooling module having a plate-shaped metal part and which cooling module cools the heat generating body within the chassis,
wherein the cooling module includes a heat receiving member that abuts on the heat generating body, and an elastic member that presses the heat receiving member against the heat generating body,
wherein the metal part includes a shield wall interposed between the antenna and the electronic part,
wherein the shield wall is in the heat receiving member or the elastic member.

2. The electronic apparatus according to claim 1, wherein the metal part includes a protruding plate portion protruding along a plane direction of the chassis, and
wherein the shield wall is curved at an end of the protruding plate portion and stands between the antenna and the electronic part.

3. The electronic apparatus according to claim 2, further including a wall portion protruding from an inner surface of the chassis,
wherein the wall portion stands alongside the shield wall between the antenna and the electronic part.

4. The electronic apparatus according to claim 2, further including a conductive cushion material sandwiched between the shield wall and an inner surface of the chassis.

5. The electronic apparatus according to claim 3, further including a first conductive cushion material sandwiched between the shield wall and the inner surface of the chassis, and a second conductive cushion material sandwiched between the wall portion and the shield wall.

6. The electronic apparatus according to claim 2, wherein the heat generating body, the electronic part, and the antenna are arranged in a sequential order along a plane direction, and
wherein the protruding plate portion protrudes from one side of the metal part and passes over a top surface of the electronic part.

* * * * *